(12) United States Patent
Zhang et al.

(10) Patent No.: US 11,769,286 B2
(45) Date of Patent: Sep. 26, 2023

(54) BEAUTY PROCESSING METHOD, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Xinghua Zhang, Beijing (CN); Xuezhi Wang, Beijing (CN); Kai Chen, Beijing (CN); Fengyi Shang, Beijing (CN); Fan Wu, Beijing (CN); Honghao Ma, Beijing (CN); Liuxi Tao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/885,942

(22) Filed: Aug. 11, 2022

(65) Prior Publication Data
US 2022/0392128 A1    Dec. 8, 2022

Related U.S. Application Data

(63) Continuation of application No. PCT/CN2021/074638, filed on Feb. 1, 2021.

(30) Foreign Application Priority Data

Feb. 25, 2020 (CN) .......................... 202010115136.2

(51) Int. Cl.
   *G06V 40/16*     (2022.01)
   *G06T 11/60*     (2006.01)
   (Continued)

(52) U.S. Cl.
   CPC .............. *G06T 11/60* (2013.01); *G06T 5/005* (2013.01); *G06T 5/20* (2013.01); *G06V 40/171* (2022.01);
   (Continued)

(58) Field of Classification Search
   CPC . G06T 11/60; G06T 5/005; G06T 5/20; G06T 2207/30201; G06T 3/0012;
   (Continued)

(56) References Cited

U.S. PATENT DOCUMENTS 11,074,435 B2 *    7/2021    Zhai .......................... G06T 7/00
2019/0130538 A1 *    5/2019    Zeng .................... G06V 40/171
(Continued)

FOREIGN PATENT DOCUMENTS

CN     103605975 A     2/2014
CN     103632165 A     3/2014
(Continued)

OTHER PUBLICATIONS

International Patent Application No. PCT/CN2021/074638; Int'l Search Report; dated May 7, 2021; 3 pages.
(Continued)

*Primary Examiner* — Phuoc Tran
(74) *Attorney, Agent, or Firm* — BakerHostetler (57) ABSTRACT

Provided are a beauty processing method and apparatus. The method includes: obtaining an original face image, and extracting original parameter information corresponding to a site feature of a to-be-beautified site; determining, based on the original parameter information, a site beauty parameter corresponding to the to-be-beautified site; and processing the to-be-beautified site based on the site beauty parameter to generate a target face image. Thus, the personalized beauty parameters can be generated to meet the user's (Continued)

personalized beauty needs, improving the accuracy of the beauty parameter and enhancing the beauty effect.

9 Claims, 3 Drawing Sheets

(51) Int. Cl.
  *G06V 40/50* (2022.01)
  *G06T 5/00* (2006.01)
  *G06T 5/20* (2006.01)
(52) U.S. Cl.
  CPC ............ *G06V 40/172* (2022.01); *G06V 40/50* (2022.01); *G06T 2207/30201* (2013.01)
(58) Field of Classification Search
  CPC ........ G06T 2207/10004; G06V 40/171; G06V 40/172; G06V 40/50
  See application file for complete search history.

(56) References Cited

U.S. PATENT DOCUMENTS

| | | | |
|---|---|---|---|
| 2019/0304152 | A1 | 10/2019 | Saa-Garriga et al. |
| 2021/0192703 | A1* | 6/2021 | Wang .................. G06V 40/171 |

FOREIGN PATENT DOCUMENTS

| | | | |
|---|---|---|---|
| CN | 105825486 | A | 8/2016 |
| CN | 107274355 | A | 10/2017 |
| CN | 107730444 | A | 2/2018 |
| CN | 107766831 | A | 3/2018 |
| CN | 107862274 | A | 3/2018 |
| CN | 107886484 | A | 4/2018 |
| CN | 107993209 | A | 5/2018 |
| CN | 108257097 | A | 7/2018 |
| CN | 109584151 | A | 4/2019 |
| CN | 111275650 | A | 6/2020 |
| JP | 2017-220078 | A | 12/2017 |
| JP | 2018-045366 | A | 3/2018 |
| KR | 2019-0114739 | A | 10/2019 |
| WO | WO 2017/177259 | A1 | 10/2017 |
| WO | WO 2019/190142 | A1 | 10/2019 |

OTHER PUBLICATIONS

European Patent Application No. 21761290.2; Extended Search Report; dated Jul. 12, 2023; 7 pages.

Zhang et al.; "Facial beauty analysis based on features prediction and beautification models"; Patten Analysis and Applications; vol. 21; 2018; p. 529-542.

* cited by examiner

BEAUTY PROCESSING METHOD, ELECTRONIC DEVICE, AND COMPUTER-READABLE STORAGE MEDIUM

CROSS-REFERENCES TO RELATED APPLICATIONS

The present application is a continuation of International Application No. PCT/CN2021/074638, filed on Feb. 1, 2021, which claims priority to Chinese Patent Application No. 202010115136.2, titled "BEAUTY PROCESSING METHOD AND APPARATUS", filed on Feb. 25, 2020, by BEIJING BYTEDANCE NETWORK TECHNOLOGY CO., LTD The disclosures of the aforementioned applications are hereby incorporated by reference in their entireties.

FIELD

The present disclosure relates to the technical field of beauty processing, and in particular, to a beauty processing method, an electronic device, and a computer-readable storage medium.

BACKGROUND

It is very common to add beauty functions to electronic devices to meet the needs of users in life. For example, many available camera applications provide beauty functions, and users may use the beauty processing functions to perform beauty processing on face images, for the purpose of beauty.

In the related art, for a predetermined facial for, beauty parameters are generally set for users' beauty use. The current solutions for beauty processing can hardly meet the user's personalized beauty needs, and the beauty effect needs to be further improved.

SUMMARY

The present disclosure provides a beauty processing method and apparatus, which can solve the problem in the related art of improving the beauty effects.

For this purpose, a first object of the present disclosure is to provide a beauty processing method, capable of generating a personalized beauty parameter to meet the user's personalized beauty needs and improve the beauty effect.

A second object of the present disclosure is to provide a beauty processing apparatus.

A third object of the present disclosure is to provide an electronic device.

A fourth object of the present disclosure is to provide a computer-readable storage medium.

Embodiments of the first aspect of the present disclosure provide a beauty processing method. The method includes: obtaining an original face image, and extracting original parameter information corresponding to a site feature of a to-be-beautified site; determining, based on the original parameter information, a site beauty parameter corresponding to the to-be-beautified site; and processing the to-be-beautified site based on the site beauty parameter to generate a target face image.

Embodiments of the second aspect of the present disclosure provide a beauty processing apparatus. The apparatus includes: an extraction module configured to obtain an original face image and extract original parameter information corresponding to a site feature of a to-be-beautified site; a determination module configured to determine, based on the original parameter information, a site beauty parameter corresponding to the to-be-beautified site; and a processing module configured to process, based on the site beauty parameter, the to-be-beautified site to generate a target face image.

Embodiments of the third aspect of the present disclosure provide an electronic device. The electronic device includes a memory having an executable program code stored thereon. and a processor. The processor is configured to, by reading the executable program code stored in the memory to execute a program corresponding to the executable program code, implement the beauty processing method according to the embodiments of the first aspect.

Embodiments of the fourth aspect of the present disclosure provide a computer-readable storage medium, having a computer program stored on. The program, when being executed by a processor, implement the beauty processing method according to the embodiments of the first aspect.

BRIEF DESCRIPTION OF DRAWINGS

The above and/or additional aspects and advantages of the present disclosure will become apparent and readily understood from the following description of embodiments taken in conjunction with the accompanying drawings, in which.

DESCRIPTION OF EMBODIMENTS

The embodiments of the present disclosure will be described in detail below with reference to examples thereof as illustrated in the accompanying drawings, throughout which same or similar elements, or elements having same or similar functions, are denoted with same or similar reference numerals. The embodiments described below with reference to the drawings are illustrative only, and they are intended to explain, rather than limiting, the present disclosure.

A beauty processing method and a beauty processing apparatus according to the embodiments of the present disclosure will be described below with reference to the accompanying drawings.

Figure 1:
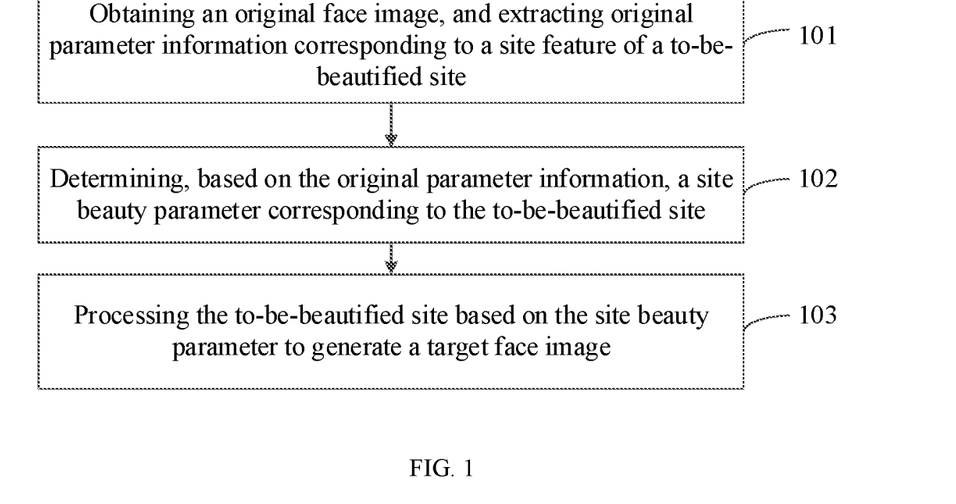
FIG. 1 is a schematic flowchart of a beauty processing method according to an embodiment of the present disclosure.

FIG. 1 is a schematic flowchart of a beauty processing method according to an embodiment of the present disclosure. As illustrated in FIG. 1, the method includes the following steps.

At Step 101, an original face image is obtained, and original parameter information corresponding to a site feature of a to-be-beautified site is extracted.

In an embodiment of the present disclosure, an execution subject is an electronic device, including, but not limited to, a device with a camera processing function, such as a smart phone and a wearable device, etc.

In the present embodiment, when performing beauty processing, an original face image may be obtained, and further, the original face image is processed by means of a relevant face recognition technology to extract the original parameter information corresponding to the site feature of the to-be-beautified site. As an example, when the user enables the camera function, a face image of the user can be photographed, and the face image can be recognized, to extract the original parameter information corresponding to the site feature of the to-be-beautified site. As another example, when the user uses the beauty function, the face image to be processed can be obtained and recognized, to extract the original parameter information corresponding to the site feature of the to-be-beautified site.

The to-be-beautified site may include face shape, eyes, eyebrows, nose, mouth, skin, and the like. Each to-be-beautified site corresponds to one or more site feature, and the site feature includes, but is not limited to, a size (length or width) and position of each site, and a distance from other parts, etc. For example, the site features of eyes may include a size of eyes, an eye distance, an eye distance and eyebrows, etc. By extracting the original parameter information corresponding to the site feature, a feature value of each site feature, such as the distance X of eyes can be obtained. Optionally, the original parameter information is a relative value, for example, a size with respect to a size of the face.

In an embodiment of the present disclosure, said extracting the original parameter information corresponding to the site feature of the to-be-beautified site includes: querying a predetermined local beauty database to obtain a local feature corresponding to the to-be-beautified site; and extracting, from the original face image, first original parameter information corresponding to the local feature.

As an example, the local beauty database is predetermined, in which the to-be-beautified sites and the local features corresponding to the to-be-beautified sites are stored. For example, the local features of eyes may include a size of eyes, an eye distance, an eye distance and eyebrows, etc. By querying the local beauty database, the local feature corresponding to the to-be-beautified site can be obtained, and then the local feature can be extracted based on the original face image, to obtain the first original parameter information corresponding to the local feature.

At Step 102, a site beauty parameter corresponding to the to-be-beautified site is determined based on the original parameter information.

In an embodiment of the present disclosure, said determining, based on the original parameter information, the site beauty parameter corresponding to the to-be-beautified site includes: determining the site beauty parameter corresponding to the first original parameter information by querying the local beauty database.

As an example, a mapping relationship between the first original parameter information and the site beauty parameter is stored in the local beauty database, and the site beauty parameter corresponding to the first original parameter information is determined by querying the mapping relationship in the local beauty database. Different pieces of first original parameter information may correspond to different site beauty parameters. For example, the distances between eyes are different, and the determined eye beauty parameters are different. The specific mapping relationship between the first original parameter information and the site beauty parameter may be determined through a large amount of experimental data or may be set as required, for example, by means of Artificial Intelligence (AI) modeling, which is not specifically limited herein.

As another example, the site beauty parameter is generated through performing a calculation on the first original parameter information based on a related algorithm. For example, a plurality of pieces of first original parameter information may be subjected to the calculation to generate the beauty parameters.

At Step 103, the to-be-beautified site is processed based on the site beauty parameter to generate the target face image.

In the present embodiment, the image to be beautified is obtained, and after the site beauty parameter is determined based on each to-be-beautified site, and then each to-be-beautified site in the image to be beautified can be processed based on the site beauty parameter to generate the target face image, which has subjected to the beauty processing.

As an example, each to-be-beautified site may include a plurality of adjustment items. For example, face shape may include adjustment items such as size, cheekbone, jawbone, forehead, chin, hairline, etc. For example, skin may include adjustment items such as dermabrasion, skin rejuvenation, skin color, etc. Each to-be-beautified site may correspond to a plurality of beauty parameters. A matching site beauty parameter is determined for each adjustment item, and the site beauty parameter is transmitted to a rendering engine, which can perform a beauty rendering processing for each adjustment item, thereby generating the target face image subjected to the beauty processing.

In the related art, when performing beauty processing, a default beauty parameter may be usually set for a predetermined face shape for the user's beauty use. For example, a default beauty parameter is set for a standard face, which refers to a model face shape generated based on the users' average face shape characteristics. Individuals' faces are different. For example, as for the same long face, some people may have a face shape close to a rectangular shape, while some people may have a face shape close to an oval shape; as for the same face shape, the distribution and characteristics of facial features may be different. For instance, as for the users having a long oval face, the size of the mouth and eyes of different users may be different. Due to the differences of individuals' faces, the solution, in which the default beauty parameter is set, is not necessarily suitable for all the users. Therefore, the relevant solutions can hardly meet the users' personalized beauty needs, the accuracy of the beauty parameter is not high enough, and the beauty effect needs to be improved.

In the beauty processing method according to the embodiments of the present disclosure, the original face image is obtained, and the original parameter information corresponding to the site feature of the to-be-beautified site is extracted; the site beauty parameter corresponding to the to-be-beautified site is determined based on the original parameter information; and the to-be-beautified site is processed based on the site beauty parameter to generate a target face image. In this way, the personalized beauty parameter can be generated based on the characteristics of the position and proportion of each to-be-beautified site in the face, to meet the user's personalized beauty needs, and the accuracy of the beauty parameter can be enhanced, thereby improving the beauty effect.

Based on the above embodiments, the global feature corresponding to the to-be-beautified site can also be obtained; the global beauty parameter can be determined based on the second original parameter information corresponding to the global feature; and the site beauty parameter can be adjusted based on the global beauty parameter, thereby achieving the related beauty adjustment and improving the beauty effect.

Figure 2:
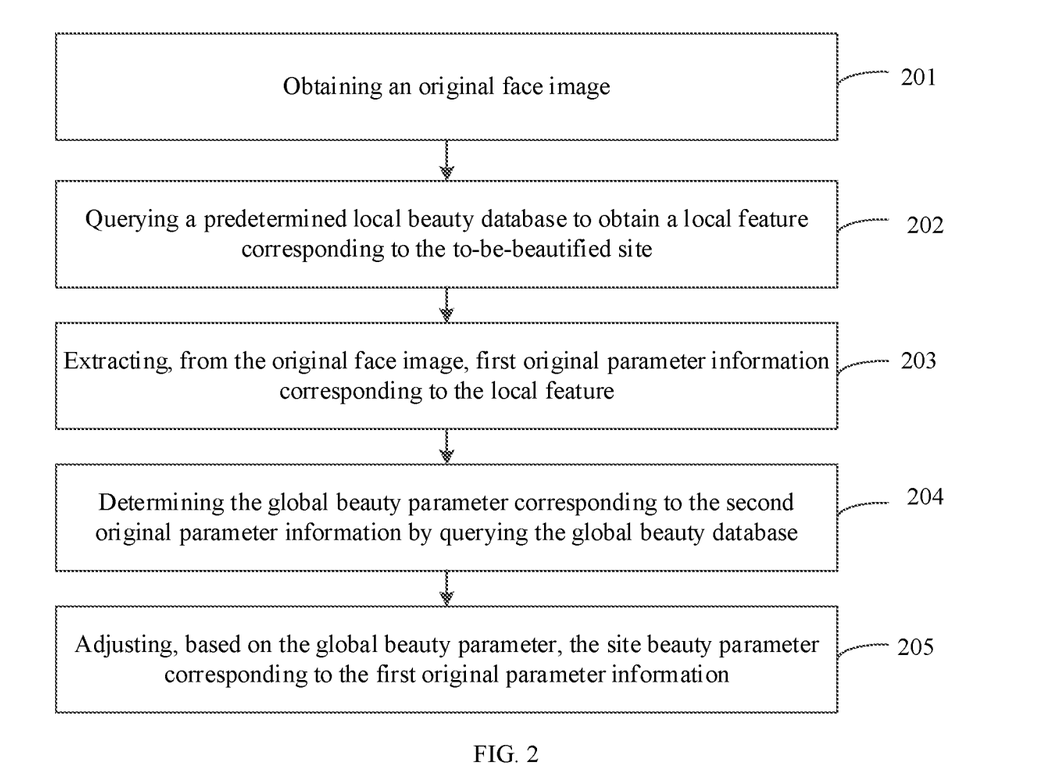
FIG. 2 is a schematic flowchart of a beauty processing method according to another embodiment of the present disclosure.

FIG. 2 is a schematic flowchart of a beauty processing method according to another embodiment of the present disclosure. As illustrated in FIG. 2, the method includes the following steps.

At Step 201, an original face image is obtained.

At Step 202, a predetermined global beauty database is queried to obtain a global feature corresponding to the to-be-beautified site.

In the present embodiment, the global beauty database is predetermined, in which the to-be-beautified sites and the global feature corresponding to the to-be-beautified sites are stored. The global feature may include the local feature of the to-be-beautified site associated with the current to-be-beautified site. For example, the global feature corresponding to eyes include a face width, a face length, a forehead height, etc.

At Step 203, second original parameter information corresponding to the global feature is extracted from the original face image.

In the present embodiment, after the global feature corresponding to the to-be-beautified site is obtained by querying the global beauty database, a feature extraction can be performed on the global feature based on the original face image, and then second original parameter information corresponding to the global feature can be obtained.

At Step 204, the global beauty database is queried, and the global beauty parameter corresponding to the second original parameter information is determined.

In the present embodiment, a mapping relationship between the second original parameter information and the global beauty parameter is stored in the global beauty database. Different pieces of second original parameter information may correspond to different global beauty parameters. The quantified value of the specific relationship between the second original parameter information and the global beauty parameter may be determined as needed, for example, through AI modeling.

As an example, the to-be-beautified site is a mouth, and a corresponding adjustment item is a thickness of lip; the corresponding global feature include a face length and a face width, and the extracted second original parameter information includes face a length X and a face width Y; and further, based on the global beauty database, the beauty parameter A corresponding to the face length X and the face width Y is determined as the global beauty parameter of the adjustment item.

Optionally, the global beauty database may be correspondingly set for different user attribute. Different user attributes correspond to different mapping relationships in the global beauty database.

In an embodiment of the present disclosure, in a beauty processing scenario of a predetermined face shape, after the global beauty parameter corresponding to the second original parameter information is determined, a default beauty parameter of the predetermined face shape may be adjusted based on the global beauty parameter, to generate the site beauty parameter. For example, the global beauty parameter may be added to the default beauty parameter to obtain the site beauty parameter. It should be noted that the default beauty parameter is adjusted based on the global beauty parameter, and the site beauty parameter may be generated in a manner other than said addition, which is not specifically limited herein.

At Step 205, the site beauty parameter corresponding to the first original parameter information is adjusted based on the global beauty parameter.

In the present embodiment, after obtaining the original face image, the local feature corresponding to the to-be-beautified site is obtained by querying the predetermined local beauty database, and the first original parameter information corresponding to the local feature is extracted from the original face image, and the site beauty parameter corresponding to the first original parameter information is determined by querying the local beauty database. Furthermore, the site beauty parameter corresponding to the first original parameter information is adjusted based on the global beauty parameter. For example, the site beauty parameter 1 is determined based on the first original parameter, the global beauty parameter may be added to the site beauty parameter 1 to obtain the site beauty parameter 2, which is used as the final site beauty parameter.

Optionally, a confidence interval may be predetermined, and the adjusted site beauty parameter may be matched with the confidence interval. When the adjusted site beauty parameter is within the confidence interval, the to-be-beautified site is allowed to be processed based on the site beauty parameter.

Optionally, said querying the predetermined local beauty database includes: obtaining a user attribute; and querying a local beauty database corresponding to the user attribute. A corresponding local beauty database is set for a different user attribute. A mapping relationship between the first original parameter information and the site beauty parameter is stored in the local beauty database. The different user attributes corresponding to different mapping relationships. The user attribute can be obtained in various manners, including, but not limited to, face recognition and the like.

In the actual application process, since the face is usually taken as a whole, when only performing beautifying the individual to-be-beautified sites to the average or optimal values, the target face image after beauty processing may not be the most "beautiful", and uncoordinated negative optimization may even occur.

In the beauty processing method according to the embodiments of the present disclosure, the global feature corresponding to the to-be-beautified site is obtained by querying the predetermined global beauty database. Further, the second original parameter information corresponding to the global feature is extracted from the original face image. Further, the global beauty parameter corresponding to the second original parameter information is determined by querying the global beauty database, and the site beauty parameter corresponding to the first original parameter information is adjusted based on the global beauty parameter. In this way, the user's personalized beauty needs can be satisfied, and the overall beautified face image is more coordinated by implementing the beauty method of correlation adjustment, thereby avoiding negative optimization and improving the beauty effect.

In an embodiment of the present disclosure, after the site beauty parameter corresponding to the to-be-beautified site is determined based on the original parameter information, the method further includes: saving the site beauty parameter, and assigning a user identifier to the site beauty parameter. The user identifier corresponds to the original parameter information. Further, an image to be beautified is obtained; the original parameter information corresponding to the site feature of the to-be-beautified site is extracted based on the image to be beautified; and a corresponding target user identifier is determined by matching the original parameter information with the pre-stored original parameter information. Further, a target face image is generated by calling the site beauty parameter corresponding to the target user identifier to process the to-be-beautified site. Thus, the generated site beauty parameter based on the user identifier is stored, and a new beauty parameter is recalculated once a change of the human face is detected, and it is saved uniformly with the user identifier. In this way, the prestored beauty parameter corresponding to the current user can be obtained without recalculation when performing the beauty processing, improving processing efficiency.

Based on the above embodiments, the following description will be given in combination with actual application scenarios.

Referring to the Table, the to-be-beautified sites may include face shape, eyes, nose, mouth, etc., and each to-be-beautified site includes a plurality of adjustment items. For each adjustment item, one or more corresponding reference items are predetermined.

| To-be-beautified site | Adjustment item | Reference item |
|---|---|---|
| Face shape | Size | Face length, face width, cheekbones, mandible, forehead, chin, lip width |
| | Cheekbones | Face length, face width, chin |
| | Mandible | Face length, face width, distance between chin and mouth |
| | Forehead | Face length, forehead height (distance between eyebrows and hairline), nose length, mandible height |
| Eye | Eye distance | Face width, eye distance |
| | Size | Face width, face length, eye distance |
| | Eye position | Face length, eye distance and eyebrows, forehead height |
| Nose | Nose length | Face length, distance between nose tip and eyebrows, distance between nose tip and chin |
| | Nose width | Face width, eye distance |
| | Nose height | Eye distance, eye size, mouth size |
| Mouth | Width | Face width, lip thickness |
| | Lip thickness | Face length, face width |
| | Mouth position | Distance between mouth and eyebrows, distance between mouth and chin |
| | Lip color | Facial skin color |
| | Teeth | Whiting |
| | Mouth shape | Smiling face |

When performing beauty processing, the beauty priority is predetermined, and beauty processing of the adjustment items of respective to-be-beautified sites is performed according to an order corresponding to the beauty priority. For example, the beauty processing of the adjustment items may be performed in an order from the top of the Table to the bottom of the Table. As an example, the beauty processing of the face size is performed first in such a manner that: the original parameter information of the face length, face width, cheekbones, mandible, forehead, chin, lip width and other features is extracted from the face image; a beauty parameter 1 corresponding to the face shape is generated based on the above original parameter information; and the beauty processing for the face size is performed based on the beauty parameter 1. Further, subsequent to the beauty processing of the face size, the parameter information about the face length and width is updated and recorded, and the beautified face length and face width are obtained. Based on the beautified face length and face width as well as the extracted parameter information of the chin, the beauty parameter 2 corresponding to the cheekbones is determined, and beauty processing for the cheekbones is performed based on the beauty parameter 2.

The beauty processing of the subsequent adjustment items may be implemented with reference to the above example, which is not repeated herein. It should be noted that, when processing the adjustment items, the beauty parameter may be determined based on one or more of the reference items, and other reference items may be added as needed, which is not limited herein. In this way, the personalized beauty parameter can be generated based on the characteristics of the position and proportion of respective to-be-beautified sites in the face, to meet the user's personalized beauty needs, and the accuracy of the beauty parameter and the beauty effect are improved. In addition, the beauty processing method of correlation adjustment is implemented, allowing the overall face image after performing beauty processing to be more coordinated, which avoids negative optimization and improves the beauty effect.

The present disclosure further provides a beauty processing apparatus.

Figure 3:
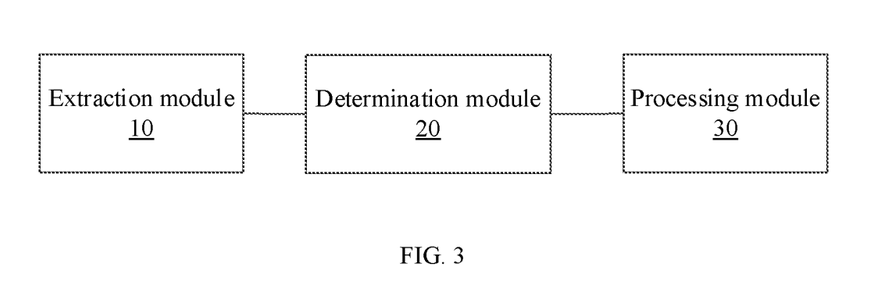
FIG. 3 is a schematic structural diagram of a beauty processing apparatus according to an embodiment of the present disclosure.

FIG. 3 is a schematic structural diagram of a beauty processing apparatus according to an embodiment of the present disclosure. As illustrated in FIG. 3, the apparatus includes an extraction module 10, a determination module 20, and a processing module 30. The extraction module 10 is configured to obtain an original face image and extract original parameter information corresponding to a site feature of a to-be-beautified site. The determination module 20 is configured to determine, based on the original parameter information, a site beauty parameter corresponding to the to-be-beautified site. The processing module 30 is configured to process, based on the site beauty parameter, the to-be-beautified site to generate a target face image.

Figure 4:
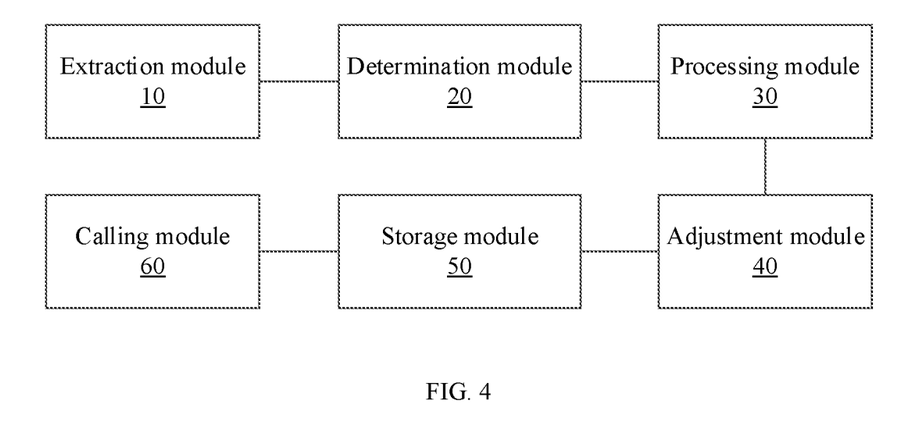
FIG. 4 is a schematic structural diagram of a beauty processing apparatus according to another embodiment of the present disclosure.

On the basis of FIG. 3, the apparatus illustrated in FIG. 4 further includes an adjustment module 40, a storage module 50, and a calling module 60.

The adjustment module 40 is configured to determine the global beauty parameter corresponding to the second original parameter information by querying the global beauty database; and adjust, based on the global beauty parameter, the site beauty parameter corresponding to the first original parameter information.

The extraction module 10 includes a second query unit and a second extraction unit. The second query unit is configured to query a predetermined global beauty database to obtain a global feature corresponding to the to-be-beautified site. The second extraction unit is configured to extract the second original parameter information corresponding to the global feature from the original face image.

In an embodiment of the present disclosure, the extraction module 10 includes a first query unit and a first extraction unit. The first query unit is configured to query a predetermined local beauty database to obtain a local feature corresponding to the to-be-beautified site. The first extraction unit is configured to extract first original parameter information corresponding to the local feature from the original face image.

The determination module 20 is specifically configured to determine site beauty parameter corresponding to the first original parameter information by querying the local beauty database.

In an embodiment of the present disclosure, the first query unit is specifically configured to: obtain a user attribute, and query a local beauty database corresponding to the user attribute. A mapping relationship between the first original parameter information and the site beauty parameter is stored in the local beauty database. The different user attributes correspond to the different mapping relationships.

The storage module 50 is configured to store the site beauty parameter, and assign a user identifier to the site beauty parameter. The user identifier corresponds to the original parameter information.

The calling module 60 is configured to: determine a corresponding target user identifier based on the original parameter information; and call the site beauty parameter corresponding to the target user identifier to process the to-be-beautified site to generate the target face image.

It should be noted that, the explanations on the beauty processing method in the above embodiments are also applicable to the beauty processing apparatus of the present embodiments, which are not repeated herein.

In the beauty processing apparatus according to the embodiments of the present disclosure, the original face image is obtained, and the original parameter information corresponding to the site feature of the to-be-beautified site is extracted; the site beauty parameter corresponding to the to-be-beautified site is determined based on the original parameter information; and the to-be-beautified site is processed based on the site beauty parameter to generate the target face image. In this way, the personalized beauty parameter can be generated based on the characteristics of the position and proportion of each to-be-beautified site in the face, to meet the user's personalized beauty needs, and the accuracy of the beauty parameter can be enhanced, thereby improving the beauty effect.

The present disclosure further provides an electronic device.

Figure 5:
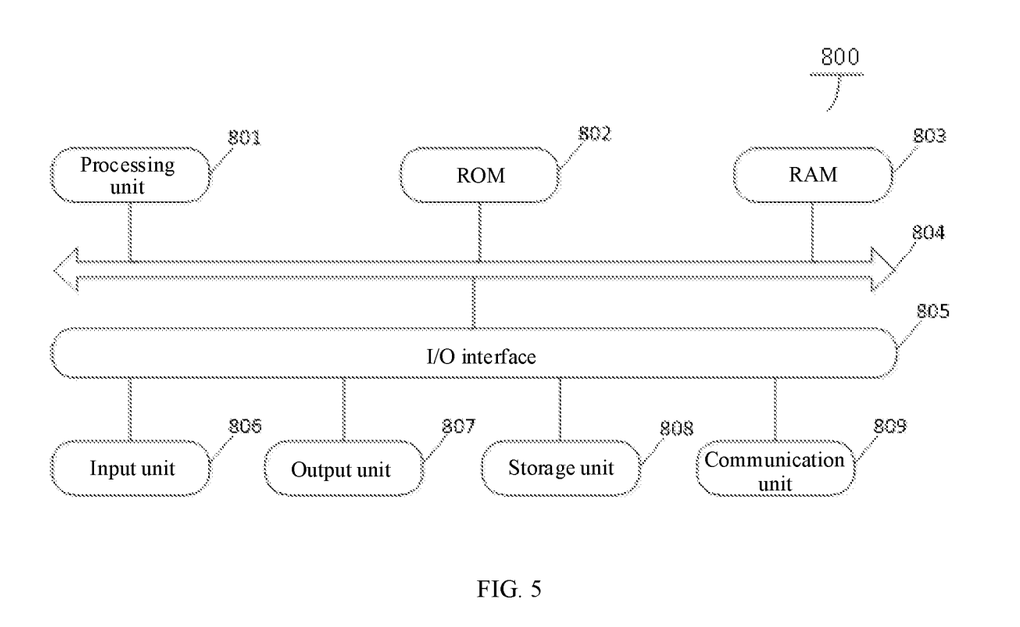
FIG. 5 is a schematic structural diagram of an electronic device adapted to implement an embodiment of the present disclosure.

FIG. 5 is a structural schematic diagram of an electronic device 800 adapted to implement the embodiments of the present disclosure. Referring to FIG. 5, the terminal device according to the embodiment of the present disclosure may include, but not limited to, a mobile terminal such as a mobile phone, a laptop computer, a digital broadcast receiver, a Personal Digital Assistant (PDA), a tablet computer (PAD), a Portable Multimedia Player (PMP), or a vehicle-mounted terminal (e.g., a vehicle-mounted navigation terminal); or a fixed terminal such as a digital TV, a desktop computer, etc. The electronic device illustrated in FIG. 5 is merely for illustration, and should not be construed as limiting the function and scope of use of the embodiments of the present disclosure.

As illustrated in FIG. 5, the electronic device 800 may include a processing unit 801 (such as a central processing unit, a graphics processing unit, etc.), which may perform various appropriate actions and processes in accordance with programs stored in a Read Only Memory (ROM) 802 or loaded from a storage unit 808 into a Random Access Memory (RAM) 803. In the RAM 803, various programs and data required for the operation of the electronic device 800 may also be stored. The processing unit 801, the ROM 802, and the RAM 803 are connected to each other through a bus 804. An input/output (I/O) interface 805 is also connected to the bus 804.

Generally, the following units may be connected to the I/O interface 805: an input unit 806, for example, including a touch screen, a touch pad, a keyboard, a mouse, a camera, a microphone, an accelerometer, a gyroscope, etc.; an output unit 807, for example, including a Liquid Crystal Display (LCD), a speaker, an oscillator, etc.; a storage unit 808, for example, including a magnetic tape or a hard disk, etc.; and a communication unit 809. The communication unit 809 may allow the electronic device 800 to be in a wireless or wired communication with other devices for data exchange. Although FIG. 5 illustrates the electronic device 800 having various apparatuses, it should be appreciated that it is not necessary to implement or provide all the illustrated apparatuses. Alternatively, more or fewer apparatuses may be implemented or provided.

In particular, according to an embodiment of the present disclosure, the processes described above with reference to the flowcharts may be implemented as computer software programs. For example, an embodiment of the present disclosure includes a computer program product. The computer program product includes a computer program carried on a computer readable medium. The computer program includes program codes for implementing the method illustrated in any of the flowcharts. In these embodiments, the computer program may be downloaded and installed from a network through the communication unit 809, or installed from the storage unit 808, or installed from the ROM 802. When the computer program is executed by the processing unit 801, the above functions mentioned in the methods according to the embodiments of the present disclosure are performed.

It should be noted that the above computer-readable medium in the present disclosure may be a computer-readable signal medium or a computer-readable storage medium or any combination thereof. The computer-readable storage medium may be, but not limited to, an electrical, magnetic, optical, electromagnetic, infrared, or semiconductor system, apparatus, or device, or any combinations thereof. More specific examples of the computer-readable storage medium may include, but not limited to, an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or saving programs, which may be used by or used in combination with an instruction execution system, apparatus, or device. However, in the present disclosure, the computer-readable signal medium may include a data signal propagated in a baseband or as a part of a carrier that carries computer-readable program codes. Such propagated data signal may be in various forms, including, but not limited to, an electromagnetic signal, an optical signal, or any suitable combination thereof. The computer-readable signal medium may also be any computer-readable medium other than the computer-readable storage medium, which is capable of transmitting, propagating, or transferring programs used by or used with an instruction execution system, apparatus or device. The program codes contained on the computer-readable medium may be transmitted via any appropriate medium, including, but not limited to, electric cable, optical cable, Radio Frequency (RF), etc., or any suitable combinations thereof.

The above computer-readable medium may be included in the above electronic device or standalone without being assembled into the electronic device.

The above computer-readable medium carries one or more programs. When the above one or more programs are executed by the electronic device, the electronic device is allowed to: acquire at least two Internet Protocol addresses; transmit a node evaluation request including the at least two Internet Protocol addresses to a node evaluation device, in which the node evaluation device selects and returns one Internet Protocol address from the at least two Internet Protocol addresses; receive the Internet Protocol address returned by the node evaluation device, in which the obtained Internet Protocol address indicates an edge node in the content distribution network.

Alternatively, the above computer-readable medium carries one or more programs. When the above one or more programs are executed by the electronic device, the electronic device is allowed to: receive a node evaluation request including at least two Internet Protocol addresses; select the Internet Protocol address from the at least two Internet Protocol addresses; return the selected Internet Protocol address, in which the received Internet Protocol address indicates an edge node in the content distribution network.

The computer program code for performing the operations of this disclosure may be written in one or more programming languages, or a combination thereof. The above programming languages include, but are not limited to, object-oriented programming languages such as Java, Smalltalk, C++, and further include conventional procedural programming languages such as "C" language or similar programming languages. The program code may be executed entirely on the user's computer, or partly on the user's computer, or executed as an independent software package, or partly on the user's computer and partly executed on a remote computer, or entirely executed on the remote computer or server. In the case involving a remote computer, the remote computer may be connected to the user's computer through any kind of network, including a local area network (LAN) or a wide area network (WAN), or it may be connected to an external computer (for example, via an Internet connection provided by an Internet service provider).

The flowcharts and block diagrams in the drawings illustrate the possible implementations of the systematic architecture, functions, and operations of the system, method, and computer program product according to various embodiments of the present disclosure. In this regard, each block in the flowcharts or block diagrams may represent a module, a program segment, or a part of code, and the module, the program segment, or the part of code contains one or more executable instructions for implementing the specified logic function. It should also be noted that, in some alternative implementations, the functions marked in the block may also executed in an order other than that illustrated in the drawings. For example, two successive blocks as illustrated may actually be executed substantially in parallel, and they may sometimes be executed in a reverse order, depending on the involved functions. It should also be noted that each block in the block diagrams and/or flowcharts, and the combination of the blocks in the block diagrams and/or flowcharts, may be implemented by a dedicated hardware-based system for executing the specified functions or operations, or may be implemented by a combination of dedicated hardware and computer instructions.

The units involved in the embodiments of the present disclosure may be implemented in a form of software or hardware. The name of the unit does not constitute a limitation on the unit itself under certain circumstances. For example, the first obtaining unit may also be described as "a unit for at least two Internet Protocol addresses".

In order to implement the above embodiments, the present disclosure further provides a computer-readable storage medium having a computer program stored on. The program, when being executed by a processor, executes the method according to the above embodiments.

Figure 6:
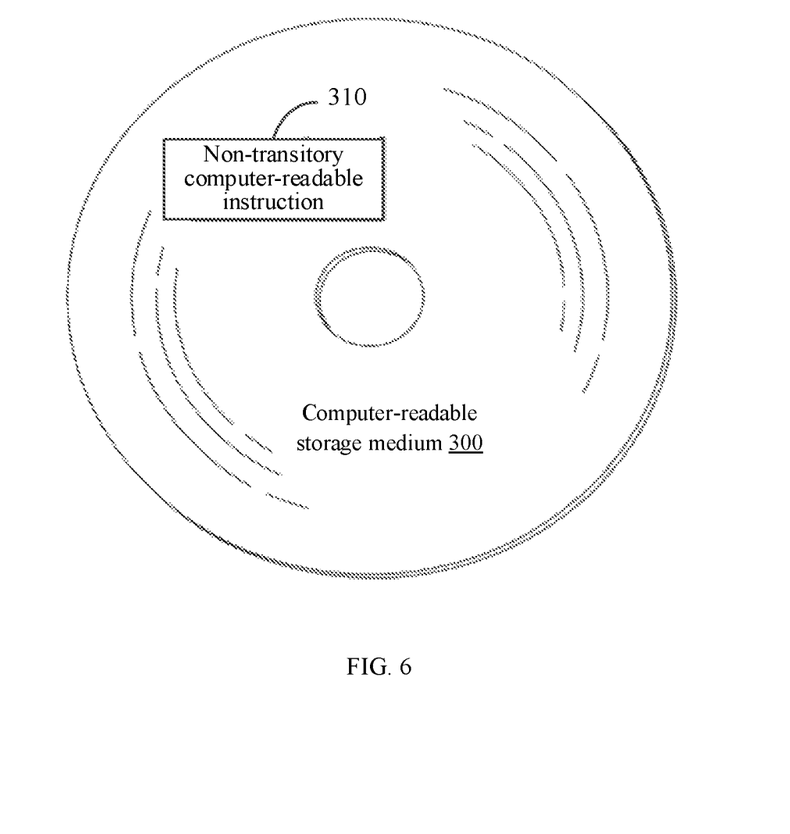
FIG. 6 is a schematic diagram of a computer-readable storage medium according to an embodiment of the present disclosure.

FIG. 6 is a schematic diagram of a computer-readable storage medium according to an embodiment of the present disclosure. As illustrated in FIG. 6, the computer-readable storage medium 300 according to the present embodiment of the present disclosure has non-transitory computer-readable instructions 310 stored thereon. When the non-transitory computer-readable instructions 310 are executed by the processor, all or part of the steps of the method according to the above embodiments of the present disclosure are executed.

In order to implement the above embodiments, the present disclosure also provides a computer program product. When the instructions in the computer program product are executed by a processor, the method according to the above embodiments is implemented.

Although the embodiments of the present disclosure are illustrated and described above, it should be understood that the above embodiments are exemplary and should not be construed as limitations of the present disclosure. Those of ordinary skill in the art can make

What is claimed is:

1. A beauty processing method, comprising:
   obtaining an original face image, and extracting original parameter information corresponding to a site feature of a to-be-beautified site, wherein the extracting original parameter information corresponding to a site feature of a to-be-beautified site comprising:
   querying a predetermined local beauty database to obtain a local feature corresponding to the to-be-beautified site,
   extracting, from the original face image, first original parameter information corresponding to the local feature,
   querying a predetermined global beauty database to obtain a global feature corresponding to the to-be-beautified site, and
   extracting, from the original face image, second original parameter information corresponding to the global feature;
   determining, based on the original parameter information, a site beauty parameter corresponding to the to-be-beautified site, wherein the determining, based on the original parameter information, a site beauty parameter corresponding to the to-be-beautified site comprises:
   determining the site beauty parameter corresponding to the first original parameter information by querying the local beauty database,
   determining the global beauty parameter corresponding to the second original parameter information by querying the global beauty database, and
   adjusting, based on the global beauty parameter, the site beauty parameter corresponding to the first original parameter information; and
   processing the to-be-beautified site based on the site beauty parameter to generate a target face image.

2. The method according to claim 1, wherein said querying the predetermined local beauty database comprises:
   obtaining a user attribute; and
   querying a local beauty database corresponding to the user attribute,
   wherein a mapping relationship between the first original parameter information and the site beauty parameter is stored in the local beauty database, different user attributes corresponding to different mapping relationships.

3. The method according to claim 1, further comprising:
   saving the site beauty parameter, and assigning a user identifier to the site beauty parameter, wherein the user identifier corresponds to the original parameter information; and wherein the method further comprises, subsequent to said extracting the original parameter information corresponding to the site feature of the to-be-beautified site:
  determining a corresponding target user identifier based on the original parameter information; and
  calling the site beauty parameter corresponding to the target user identifier to process the to-be-beautified site to generate the target face image.

4. An electronic device, comprising:
  a memory having an executable program code stored thereon; and
  a processor,
  wherein the processor is configured to execute, by reading the executable program code, a program corresponding to the executable program code, to implement operations, the operations comprising:
  obtaining an original face image, and extracting original parameter information corresponding to a site feature of a to-be-beautified site, wherein the extracting original parameter information corresponding to a site feature of a to-be-beautified site comprising:
    querying a predetermined local beauty database to obtain a local feature corresponding to the to-be-beautified site,
    extracting, from the original face image, first original parameter information corresponding to the local feature,
    querying a predetermined global beauty database to obtain a global feature corresponding to the to-be-beautified site, and
    extracting, from the original face image, second original parameter information corresponding to the global feature;
  determining, based on the original parameter information, a site beauty parameter corresponding to the to-be-beautified site, wherein the determining, based on the original parameter information, a site beauty parameter corresponding to the to-be-beautified site comprises:
    determining the site beauty parameter corresponding to the first original parameter information by querying the local beauty database,
    determining the global beauty parameter corresponding to the second original parameter information by querying the global beauty database, and
    adjusting, based on the global beauty parameter, the site beauty parameter corresponding to the first original parameter information; and
  processing the to-be-beautified site based on the site beauty parameter to generate a target face image.

5. The electronic device according to claim 4, wherein said querying the predetermined local beauty database comprises:
  obtaining a user attribute; and
  querying a local beauty database corresponding to the user attribute,
  wherein a mapping relationship between the first original parameter information and the site beauty parameter is stored in the local beauty database, different user attributes corresponding to different mapping relationships.

6. The electronic device according to claim 4, wherein the operations further comprise:
  saving the site beauty parameter, and assigning a user identifier to the site beauty parameter, wherein the user identifier corresponds to the original parameter information; and
  wherein the operations further comprise, subsequent to said extracting the original parameter information corresponding to the site feature of the to-be-beautified site:
    determining a corresponding target user identifier based on the original parameter information; and
    calling the site beauty parameter corresponding to the target user identifier to process the to-be-beautified site to generate the target face image.

7. A non-transitory computer-readable storage medium, having a computer program stored on, wherein the program, when being executed by a processor, implements operations, the operations comprising:
  obtaining an original face image, and extracting original parameter information corresponding to a site feature of a to-be-beautified site, wherein the extracting original parameter information corresponding to a site feature of a to-be-beautified site comprising:
    querying a predetermined local beauty database to obtain a local feature corresponding to the to-be-beautified site,
    extracting, from the original face image, first original parameter information corresponding to the local feature,
    querying a predetermined global beauty database to obtain a global feature corresponding to the to-be-beautified site, and
    extracting, from the original face image, second original parameter information corresponding to the global feature;
  determining, based on the original parameter information, a site beauty parameter corresponding to the to-be-beautified site, wherein the determining, based on the original parameter information, a site beauty parameter corresponding to the to-be-beautified site comprises:
    determining the site beauty parameter corresponding to the first original parameter information by querying the local beauty database,
    determining the global beauty parameter corresponding to the second original parameter information by querying the global beauty database, and
    adjusting, based on the global beauty parameter, the site beauty parameter corresponding to the first original parameter information; and
  processing the to-be-beautified site based on the site beauty parameter to generate a target face image.

8. The non-transitory computer-readable storage medium according to claim 7, wherein said querying the predetermined local beauty database comprises:
  obtaining a user attribute; and
  querying a local beauty database corresponding to the user attribute,
  wherein a mapping relationship between the first original parameter information and the site beauty parameter is stored in the local beauty database, different user attributes corresponding to different mapping relationships.

9. The non-transitory computer-readable storage medium according to claim 7, the operations further comprising:
  saving the site beauty parameter, and assigning a user identifier to the site beauty parameter, wherein the user identifier corresponds to the original parameter information; and
  wherein the operations further comprise, subsequent to said extracting the original parameter information corresponding to the site feature of the to-be-beautified site:

determining a corresponding target user identifier based on the original parameter information; and calling the site beauty parameter corresponding to the target user identifier to process the to-be-beautified site to generate the target face image.

* * * * *